United States Patent
Gay et al.

(10) Patent No.: US 10,210,128 B2
(45) Date of Patent: Feb. 19, 2019

(54) REDIRECTION OF LANE RESOURCES

(71) Applicant: Hewlett-Packard Development Company, L.P., Houston, TX (US)

(72) Inventors: Raphael Gay, Fort Collins, CO (US); Roger A. Pearson, Fort Collins, CO (US); Shane Ward, Windsor, CO (US); Byron A. Alcorn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/543,185

(22) PCT Filed: Jan. 28, 2015

(86) PCT No.: PCT/US2015/013315
§ 371 (c)(1),
(2) Date: Jul. 12, 2017

(87) PCT Pub. No.: WO2016/122493
PCT Pub. Date: Aug. 4, 2016

(65) Prior Publication Data
US 2018/0011811 A1  Jan. 11, 2018

(51) Int. Cl.
*G06F 13/40* (2006.01)
*G06F 13/42* (2006.01)

(52) U.S. Cl.
CPC ........ *G06F 13/409* (2013.01); *G06F 13/4022* (2013.01); *G06F 13/4068* (2013.01);
(Continued)

(58) Field of Classification Search
None
See application file for complete search history.

(56) References Cited

U.S. PATENT DOCUMENTS 5,956,370 A * 9/1999 Ducaroir ............... H04L 1/243
370/249
6,061,754 A   5/2000 Cepulis et al.
(Continued)

FOREIGN PATENT DOCUMENTS

GB      2552208 A *  1/2018  .......... G06F 15/161
TW     201344443     11/2013
WO    WO-2014111920  7/2014

OTHER PUBLICATIONS

'PCIe Loopback Card User Guide' by Whizz Systems Inc., Mar. 5, 2015.*

(Continued)

*Primary Examiner* — Steven G Snyder
(74) *Attorney, Agent, or Firm* — Brooks, Cameron & Heubsch PLLC

(57) ABSTRACT

An apparatus includes a pass-through module that includes connector pins to connect with at least one active portion of a motherboard connector and to separately connect with at least one inactive portion of the motherboard connector. A routing function on the pass-through module redirects a set of bidirectional lanes from the connector pins connected to the active portion of the motherboard connector to the connector pins connected to the inactive portion of the motherboard connector to enable a connection of the set of bidirectional lanes to at least one other motherboard resource connected to the inactive portion of the motherboard connector.

15 Claims, 10 Drawing Sheets

(52) U.S. Cl.
CPC ........ *G06F 13/426* (2013.01); *G06F 13/4282* (2013.01); *G06F 2213/0026* (2013.01)

(56) References Cited

U.S. PATENT DOCUMENTS

| | | | | |
|---|---|---|---|---|
| 6,325,636 | B1* | 12/2001 | Hipp | G06F 1/183 |
| | | | | 361/788 |
| 6,993,614 | B2* | 1/2006 | Le | H04L 41/046 |
| | | | | 361/679.4 |
| 7,080,264 | B2* | 7/2006 | Mahony | H05K 7/1445 |
| | | | | 713/300 |
| 7,099,969 | B2* | 8/2006 | McAfee | G06F 13/4022 |
| | | | | 710/107 |
| 7,103,704 | B2* | 9/2006 | Chatterjee | G06F 13/409 |
| | | | | 710/306 |
| 7,188,205 | B2* | 3/2007 | Le | G06F 13/4081 |
| | | | | 710/300 |
| 7,206,947 | B2* | 4/2007 | Krishnamurthy | G06F 1/26 |
| | | | | 713/320 |
| 7,293,125 | B2* | 11/2007 | McAfee | G06F 13/4022 |
| | | | | 710/107 |
| 7,363,417 | B1* | 4/2008 | Ngai | G06F 13/4022 |
| | | | | 710/305 |
| 7,533,210 | B2* | 5/2009 | Chatterjee | G06F 9/526 |
| | | | | 710/313 |
| 7,600,112 | B2 | 10/2009 | Khatri et al. | |
| 7,756,123 | B1* | 7/2010 | Huang | G06F 13/4022 |
| | | | | 370/359 |
| 8,521,941 | B2 | 8/2013 | Regula | |
| 8,996,781 | B2* | 3/2015 | Schuette | G06F 13/4068 |
| | | | | 710/301 |
| 9,330,031 | B2* | 5/2016 | Gupta | G06F 13/12 |
| 9,497,518 | B2* | 11/2016 | Mills | H04Q 11/0003 |
| 9,529,743 | B2* | 12/2016 | Huang | G06F 13/4282 |
| 2003/0140190 | A1* | 7/2003 | Mahony | G06F 13/4081 |
| | | | | 710/302 |
| 2004/0023558 | A1* | 2/2004 | Fowler | G06F 13/4278 |
| | | | | 439/632 |
| 2005/0012747 | A1* | 1/2005 | Sauber | G06F 3/14 |
| | | | | 345/501 |
| 2005/0088445 | A1* | 4/2005 | Gonzalez | G06F 3/1438 |
| | | | | 345/502 |
| 2005/0102454 | A1 | 5/2005 | McAfee et al. | |
| 2005/0240703 | A1* | 10/2005 | Nguyen | G06F 13/405 |
| | | | | 710/301 |
| 2006/0203460 | A1* | 9/2006 | Aviv | H05K 7/1492 |
| | | | | 361/788 |
| 2006/0294279 | A1 | 12/2006 | McKee et al. | |
| 2007/0139423 | A1 | 6/2007 | Kong et al. | |
| 2007/0162632 | A1 | 7/2007 | Ng et al. | |
| 2007/0224844 | A1* | 9/2007 | Chuang | G06F 13/409 |
| | | | | 439/55 |
| 2007/0294454 | A1* | 12/2007 | Danilak | G06F 3/14 |
| | | | | 710/305 |
| 2008/0242152 | A1* | 10/2008 | Yeh | G06F 13/409 |
| | | | | 439/625 |
| 2009/0043921 | A1 | 2/2009 | Roy | |
| 2009/0204736 | A1* | 8/2009 | Xie | G06F 13/4221 |
| | | | | 710/104 |
| 2010/0268859 | A1* | 10/2010 | Lee | G06F 1/183 |
| | | | | 710/104 |
| 2012/0260015 | A1* | 10/2012 | Gay | G06F 13/409 |
| | | | | 710/301 |
| 2012/0300392 | A1 | 11/2012 | Johnson et al. | |
| 2012/0311359 | A1 | 12/2012 | Jaramillo | |
| 2014/0129753 | A1* | 5/2014 | Schuette | G06F 13/4068 |
| | | | | 710/301 |
| 2015/0254205 | A1* | 9/2015 | Chu | G06F 13/4022 |
| | | | | 710/308 |
| 2015/0347345 | A1* | 12/2015 | Hellriegel | G06F 13/409 |
| | | | | 710/301 |
| 2016/0070661 | A1* | 3/2016 | Huang | G06F 13/12 |
| | | | | 710/33 |

OTHER PUBLICATIONS

Meduri, Vijay, "A Case for PCI Express as a High-performance Cluster Interconnect," Jan. 24, 2011, pp. 1-7, HPC Wire.

* cited by examiner

REDIRECTION OF LANE RESOURCES

BACKGROUND

A motherboard, also known as the main board or system board is the main printed circuit board (PCB) found in computers and other expandable systems. It holds many of the electronic components of the system, such as the central processing unit (CPU) and memory, and provides connectors for other peripherals. Unlike a backplane, a motherboard includes significant sub-system electronics such as the processor and other components. In addition to the CPU and memory, the motherboard refers to a PCB with expansion capability which often includes sound cards, video cards, network cards, hard drives, or other forms of persistent storage, TV tuner cards, cards providing extra USB or FireWire slots and a variety of other custom components. To provide expansion capability for such cards, one or more expansion buses having expansion connectors are provided with the motherboard. For many users however, more functionality is often needed from the motherboard expansion buses than provided from the base offerings of the motherboard manufacturer.

DETAILED DESCRIPTION

This disclosure relates to a pass-through module having a routing function to route bidirectional lanes between active and inactive portions of a connector to facilitate functional reconfiguration of a motherboard. An unused connector on a motherboard can be employed to route bidirectional lanes of an expansion bus from active portions of the unused connector to inactive portions of the connector to enable functional reconfiguration of the motherboard (e.g., enable unused expansion board slots to drive other motherboard resources). A pass-through module is provided that includes connector pins to connect with at least one active portion of a motherboard connector and to separately connect with at least one inactive portion of the motherboard connector. A routing function (e.g., electrical trace, redriver, retimer, clock buffer) on the pass-through module redirects a set of bidirectional lanes (and/or clock signals) from the connector pins connected to the active portion of the motherboard connector to the connector pins connected to the inactive portion of the motherboard connector. This routing enables a connection of the set of bidirectional lanes to at least one other motherboard resource connected to the inactive portion of the motherboard connector. Other motherboard resources can include other connectors or embedded devices, for example that can utilize the rerouted lanes from the motherboard connector. In one example, bidirectional lanes can be routed to the inactive portions of the motherboard connector and to embedded devices on the pass-through module. If the pass-through module is not installed, the motherboard connector can be employed to interface with standard expansion bus modules via the active portion of the connector.

Figure 1:
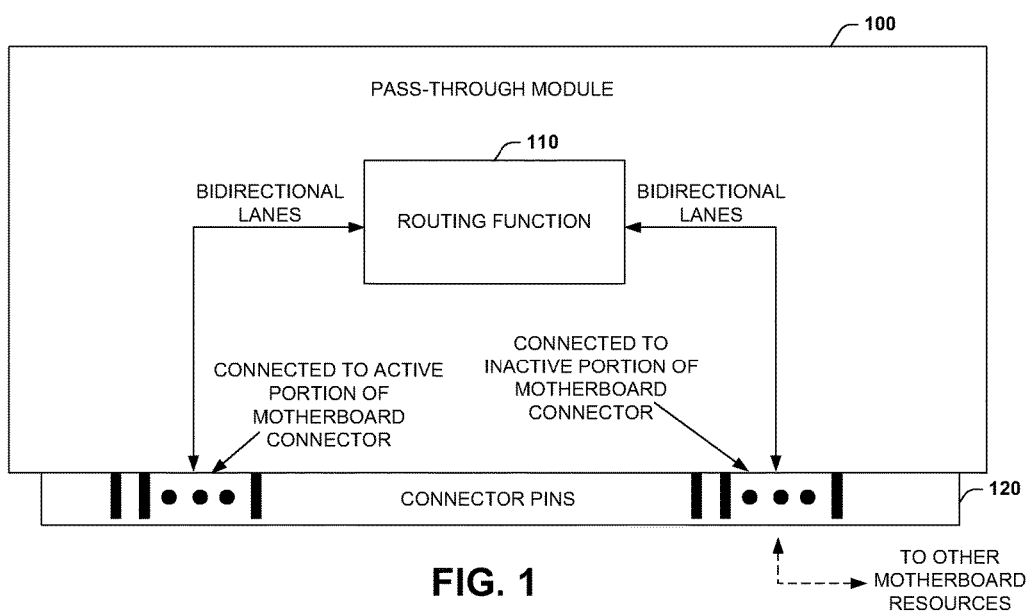
FIG. 1 illustrates an example of an apparatus that includes a pass-through module having a routing function to facilitate functional reconfiguration of a motherboard.

FIG. 1 illustrates an example of an apparatus that includes a pass-through module 100 having a routing function 110 to facilitate functional reconfiguration of a motherboard. The pass-through module 100 includes connector pins 120 to connect with an active portion of motherboard connector and to separately connect with an inactive portion of the motherboard connector. As used herein, the term active portion refers to a connector that is electrically wired to a motherboard resource (e.g., root port). The term inactive portion refers to pins that are not driven by a motherboard resource when the pass-through module 100 is not installed.

The routing function 110 on the pass-through module 100 redirects a set of bidirectional lanes (and/or clock signals not shown) from the connector pins connected to the active portion of the motherboard connector (See e.g., FIG. 2) to the connector pins connected to the inactive portion of the motherboard connector. This routing enables a connection of the set of bidirectional lanes to at least one other motherboard resource connected to the inactive portion of the motherboard connector. The routing function 110 includes electrical traces to redirect the set of bidirectional lanes. This can include at least one buffer to drive the set of bidirectional lanes or to drive a clock signal (or signals) associated with the bidirectional lanes.

In one example, the bidirectional lanes are serial input and output communications lanes of a Peripheral Component Interconnect Express (PCIe) bus. The PCIe bus is a high-speed serial replacement of older PCI/PCI-X bus. One of the differences between the PCIe bus and the older PCI is the bus topology; PCI uses a shared parallel bus architecture, in which the PCI host and all devices share a common set of address, data and control lines. In contrast, PCIe is based on point-to-point topology, with separate serial data links connecting every device to the root complex (host). Due to its shared bus topology, access to the older PCI bus is arbitrated (in the case of multiple masters), and limited to one master at a time, in a single direction.

The PCIe bus link supports full-duplex communication between any two endpoints, with no inherent limitation on concurrent access across multiple endpoints. The PCIe link between two devices can include from one to 32 bidirectional communications lanes, for example. In a multi-lane link, the packet data is striped across lanes, and peak data throughput scales with the overall link width. The lane count is automatically negotiated during device initialization, and can be restricted by either endpoint. For example, a single-lane PCIe (×1) card can be inserted into a multi-lane slot (×4, ×8, and so forth), and the initialization cycle auto-negotiates the highest mutually supported lane count. The link can dynamically down-configure itself to use fewer lanes, providing a failure tolerance in case bad or unreliable lanes are present. The PCI Express standard defines slots and connectors for multiple widths: ×1, ×4, ×8, ×12, ×16 and ×32, for example.

With respect to PCIe bus examples, there are a fixed number of PCIe links (e.g., four bidirectional lanes to a link) in any given computer system and often system designers must make difficult choices and trade-offs when allocating these valuable resources. The pass-through module 100 and routing function 110 disclosed herein allows PCIe lanes to be reallocated and/or redirected from an unused motherboard connector, thus allowing maximum design flexibility and system expandability while minimizing base system costs. In a particular example, the pass-through module 100 can plug into a PCIe slot. This includes the routing function 110 having electrical traces, and in some cases additional components (e.g., PCIe switch, embedded devices, redrivers, retimers, clock chips, and so forth) that allows PCIe interface signals to be redirected to another device or connector.

The PCIe bus provides a high-speed interface that is used to connect peripheral devices to a host computer system. A computer system that supports PCIe has one or more PCIe links and each of these links can connect a single peripheral device to the system. Conventionally, this means a system designer must route a PCIe link to a single embedded device or connector thus dedicating it to only that single embedded device, add-in adapters, or cables that are supported by the specific connector type used. The pass-through module 100 provides design flexibility and end-user configurability by allowing a PCIe link to be redirected to a different connector or device without burdening every system with additional cost. This allows for flexible system design, expandability, and end-user configurability while minimizing base system cost.

Figure 2:
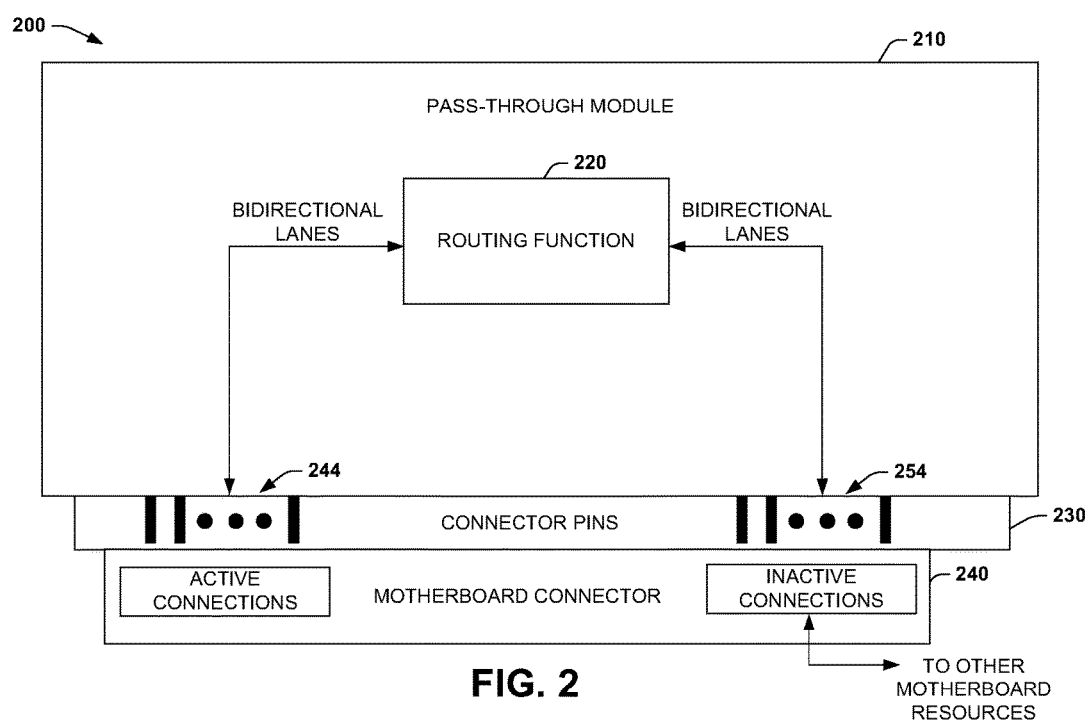
FIG. 2 illustrates an example of a system that includes a pass-through module having a routing function to route bidirectional lanes between active and inactive portions of a connector to facilitate functional reconfiguration of a motherboard.

FIG. 2 illustrates an example of a system 200 that includes a pass-through module 210 having a routing function 220 to route bidirectional lanes between active and inactive portions of a connector to facilitate functional reconfiguration of a motherboard. The system 200 includes the pass-through module 210 that includes connector pins 230. A motherboard connector 240 provides active connections to connect with a first set of the connector pins 244 and inactive connections to connect with a second set of connector pins 254 of the pass-through module 210. The routing function 220 on the pass-through module 210 redirects a set of bidirectional lanes from the first set of connector pins 244 connected to the active connections of the motherboard connector 240 to the second set of connector pins 254 connected to the inactive connections of the motherboard connector. This routing enables a connection of the set of bidirectional lanes (and/or other signals such as associated clock signals) to at least one other motherboard resource connected to the inactive connections of the motherboard connector. The routing function 220 includes electrical traces to redirect a set of bidirectional lanes and at least one buffer to drive the set of bidirectional lanes or to drive a clock signal associated with the bidirectional lanes.

As noted previously, the bidirectional lanes can be serial input and output communications lanes of a Peripheral Component Interconnect Express (PCIe) bus. Another type of bus that can be employed is a processor flexible I/O bus (e.g., Intel® processor Flex I/O). The motherboard connector 240 described herein can be a Peripheral Component Interconnect Express (PCIe) connector, for example. When the pass-through module 210 is installed to route the active connections of the motherboard connector 240, the inactive connections of the motherboard connector 240 can subsequently drive other motherboard resources. Such resources can include an M.2 connector, for example. The M.2 connector, formerly known as the Next Generation Form Factor (NGFF), is a specification for internally mounted computer expansion cards and associated connectors. It replaces the mSATA standard, which uses the PCI Express Mini Card physical layout. Computer bus interfaces provided through the M.2 connector, together with supported logical interfaces, are a superset to those defined by the SATA Express interface. The M.2 standard supports multiple interfaces that include PCI Express 3.0 and Serial ATA 3.0, an internal USB 3.0 interface and other interfaces, for example.

Other motherboard resources which can be driven from the inactive connections of the connector 240 when the pass-through module 210 is installed can include a second PCIe connector, a serial advanced technology advancement (SATA) connector, a universal serial bus (USB) port, or an embedded device (See e.g., FIG. 5), for example. Other motherboard resources may utilize additional motherboard connections not provided to it via the pass-through module 210. For example, the clock(s) required by the other resource could be provided via the pass-through module 210 or routed/directed to it via other motherboard traces.

Figure 3A:
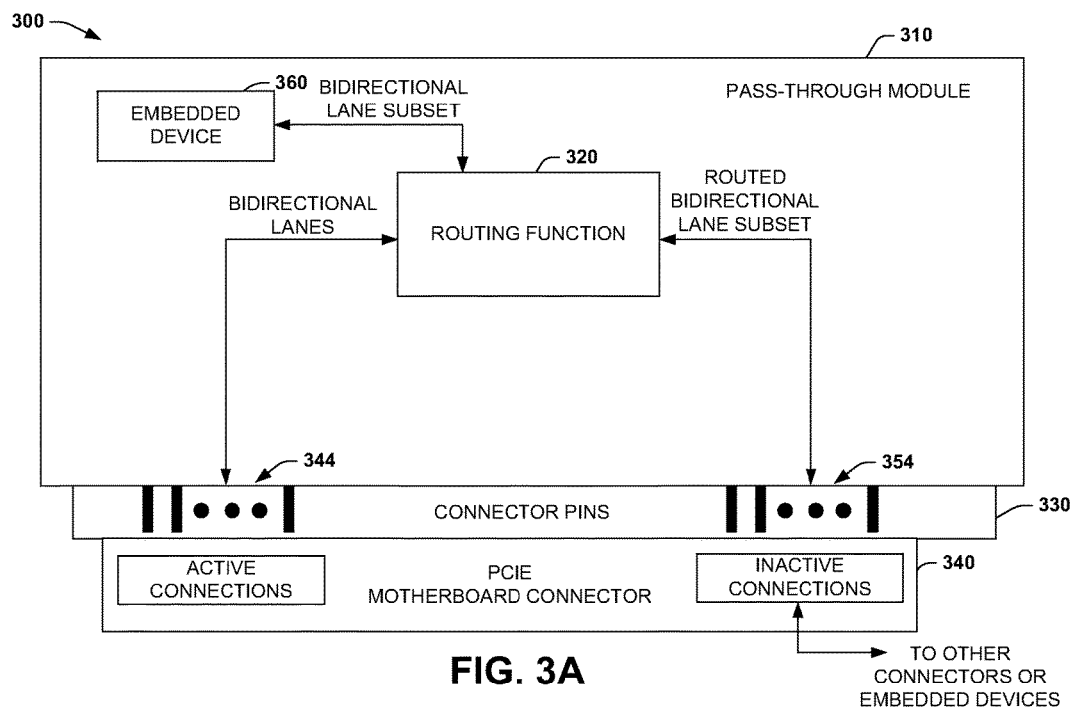
FIG. 3A illustrates an example of a system that includes a pass-through module having a routing function to route bidirectional lanes to an embedded device on the pass-through module and between active and inactive portions of a connector to facilitate functional reconfiguration of a motherboard.

FIG. 3A illustrates an example of a system 300 that includes a pass-through module 310 having a routing function 320 to route bidirectional lanes to an embedded device on the pass-through module and between active and inactive portions of a connector to facilitate functional reconfiguration of a motherboard. The system 300 includes the pass-through module 310 that includes connector pins 330. A Peripheral Component Interconnect Express (PCIe) motherboard connector 340 provides active connections to connect with a first set of the connector pins 344 and inactive connections to connect with a second set of connector pins of the pass-through module 310. The routing function 320 on the pass-through module 310 redirects a subset of bidirectional lanes (and/or clock signals) from the first set of connector pins 344 connected to the active connections of the PCIe motherboard connector 340 to the second set of connector pins 354 connected to the inactive connections of the PCIe motherboard connector. Such routing enables a connection of the routed bidirectional lanes to at least one other motherboard resource (e.g., connectors or embedded devices) connected to the inactive connections of the PCIe motherboard connector.

In this example, the bidirectional lanes are routed through the pass-through module 310 and routing function 320 to an embedded device 360 on the pass-through module to communicate via communicate via a subset of bidirectional lanes from the set of bidirectional lanes, or via all the bidirectional lanes as the case would be with, for instance, a PCIe Switch type of routing function. Thus, the pass-through module 310 in this example provides hybrid configuration having both a routing function 320 and an on-board function provided via the embedded device 360. Similar to the system previously described, when the pass-through module 310 is installed, the inactive portion of the connector 340 can route signals to motherboard resources such as connectors and/or embedded devices. These can include a second PCIe connector (See e.g., FIG. 6), a serial advanced technology advancement (SATA) connector, an M.2 connector, a universal serial bus (USB) port, or an embedded device (See e.g., FIG. 5), for example.

Figure 3B:
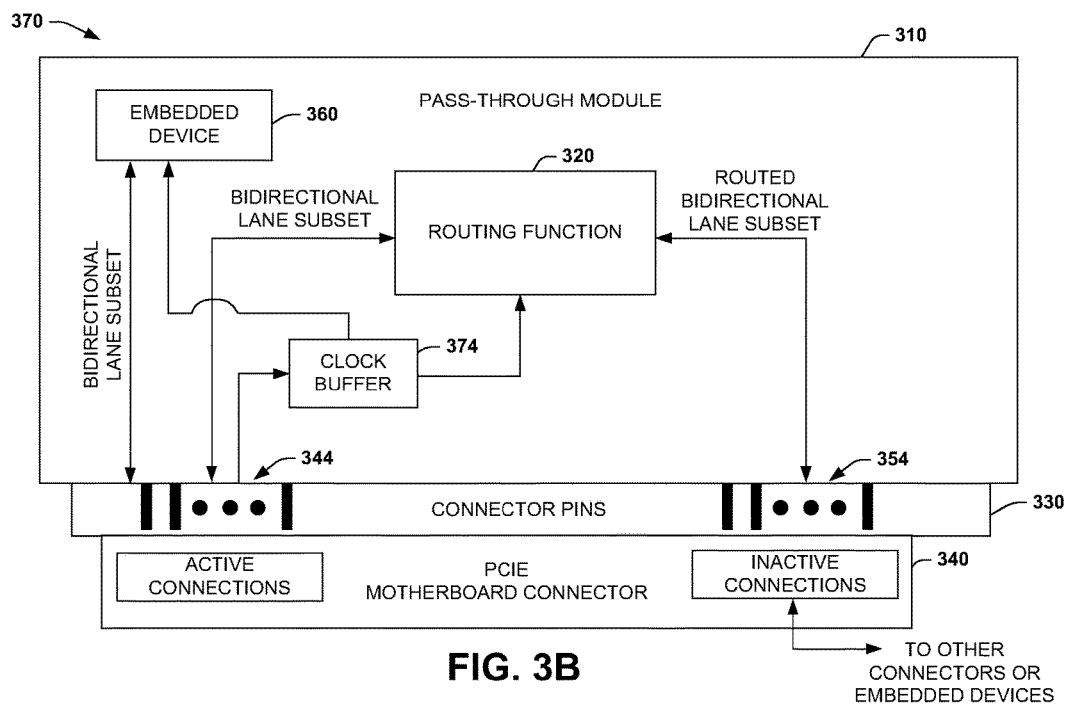
FIG. 3B illustrates an example of a system that includes a pass-through module that receives a subset of bidirectional lanes for an embedded device and employs a routing function to route a subset of bidirectional lanes between active and inactive portions of a connector to facilitate functional reconfiguration of a motherboard.

FIG. 3B illustrates an example of a system 374 that includes a pass-through module that receives a subset of bidirectional lanes for the embedded device 360 and employs the routing function 320 to route a subset of bidirectional lanes between active and inactive portions of the connector 340 to facilitate functional reconfiguration of a motherboard. In this example, rather than routing a subset of bidirectional lanes through the routing function to the embedded device 360 as shown in FIG. 3A, a subset (e.g., ×4 lanes) of bidirectional lanes is routed to the embedded device from the connector pins 344. Another subset of lanes from connector pins 344 is routed through the routing function 320 to connector pins 354 to provide a connection to the inactive connections of the motherboard connector 340. In this example, a clock buffer 374 can be provided to drive motherboard clock signals to the routing function 320 and/or the embedded device 360.

Figure 4:
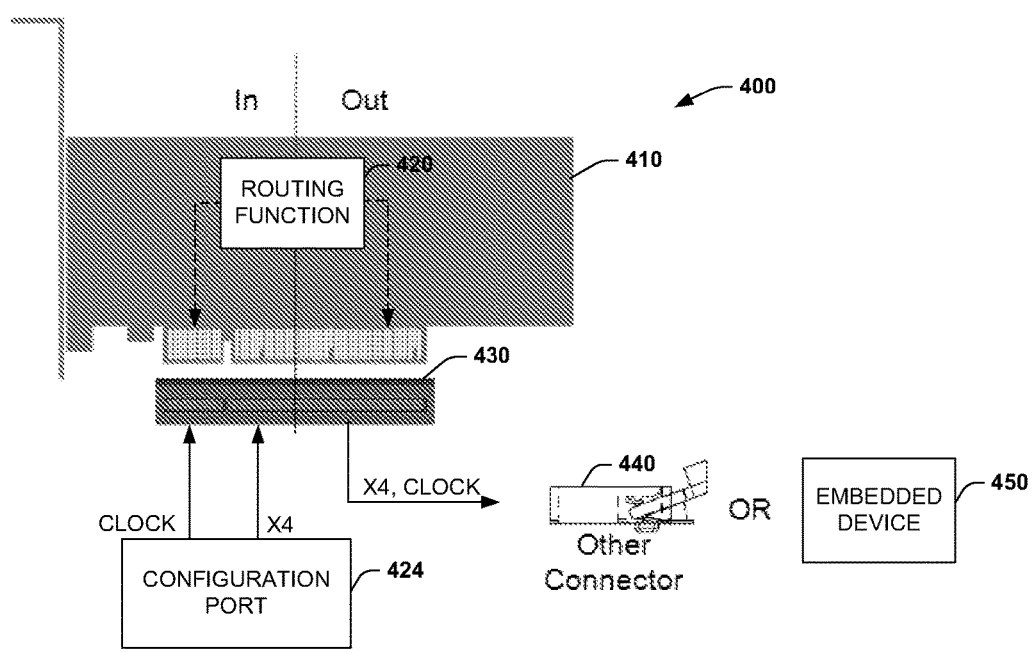
FIG. 4 illustrates an example of a system that includes a pass-through module having a routing function to route four bidirectional lanes between active and inactive portions of a connector to provide a connection to other connections or embedded devices.

FIG. 4 illustrates an example of a system 400 that includes a pass-through module 410 having a routing function 420 to route four bidirectional lanes (shown as ×4) between active and inactive portions of a connector to provide a connection to other connections or embedded devices. The system 400 includes a configuration port 424 to provide four bidirectional lanes and a clock to a PCIE connector 430. The configuration port can be a PCIe root port or a processor flex I/O port for example. The pass-through module 410 routes the clock and bidirectional lanes to an unused portion (inactive portion) of the connector 430. The connector 430 can be connected to another connector 440 (e.g., M.2 connector) or an embedded device 450. Thus, if the PCIe connector 430 were to be unused for a given application, the pass-through module 410 can be installed to redirect the lanes resources of the connector 430 to another connector 440 or an embedded device 450.

Figure 5:
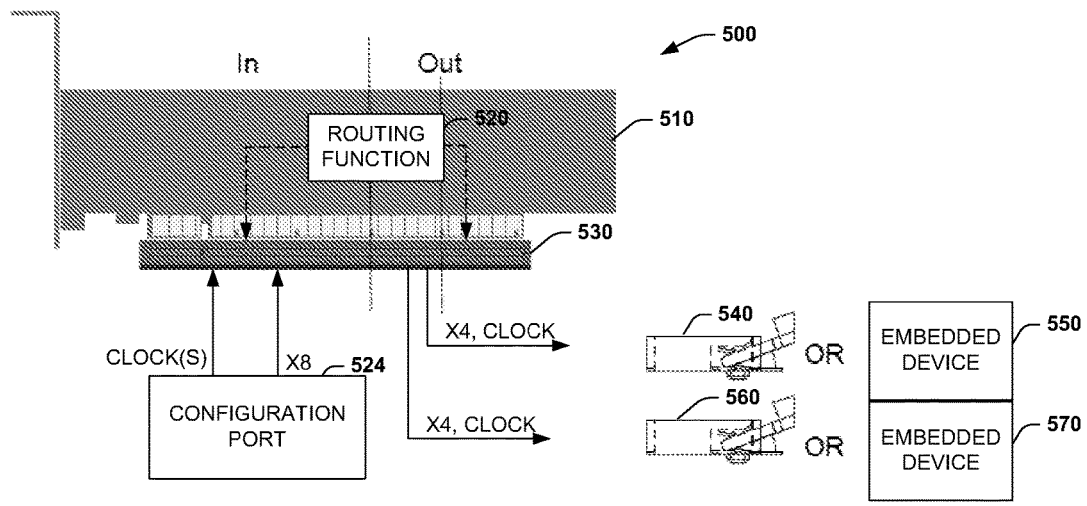
FIG. 5 illustrates an example of a system that includes a pass-through module having a routing function to route eight bidirectional lanes between active and inactive portions of a connector to provide a connection to other connections or embedded devices.

FIG. 5 illustrates an example of a system 500 that includes a pass-through module 510 having a routing function 520 to route eight bidirectional lanes (shown as ×8) between active and inactive portions of a connector to provide a connection to other connections or embedded devices. The system 500 includes a configuration port 524 to provide eight bidirectional lanes and a clock (or clocks) to a PCIE connector 530.

As noted previously, the configuration port can be a PCIe root port or a processor flex I/O port for example. The pass-through module 510 routes the clock and bidirectional lanes to an unused portion (inactive portion) of the connector 530 as a set of ×4 lanes and clocks. The connector 530 can be connected to another connector 540 (e.g., M.2 connector) or an embedded device 550 to receive one set of ×4 lanes and clock. The connector 530 can be connected to another connector 560 (e.g., M.2 connector) or an embedded device 570 to receive a second set of ×4 lanes and clock. If the PCIe connector 530 were to be unused for a given application, the pass-through module 510 can be installed to redirect the lanes resources of the connector 530 to another connector 540, 560, or to an embedded device 550, 570.

Figure 6:
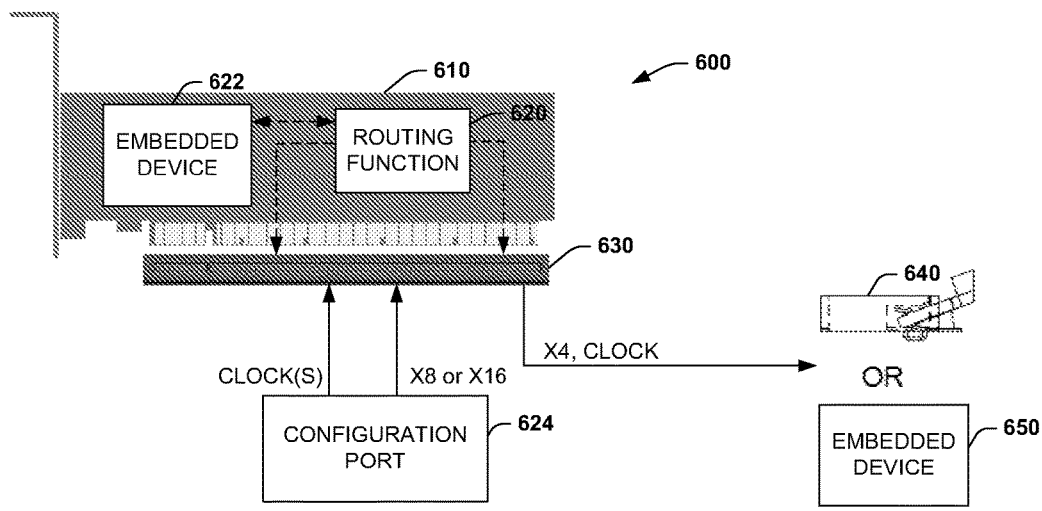
FIG. 6 illustrates an example of a system that includes a pass-through module having a routing function to route bidirectional lanes to an embedded device on the pass-through module and between active and inactive portions of a connector to provide a connection to other connections or embedded devices.

FIG. 6 illustrates an example of a system 600 that includes a pass-through module 610 having a routing function 620 to route bidirectional lanes to an embedded device 622 on the pass-through module and between active and inactive portions of a connector to provide a connection to other connections or embedded devices. Although bidirectional lanes are shown routed to the embedded device 622 via the routing function 620 (See e.g., FIG. 3A), it is also possible for the embedded device to receive a subset bidirectional lanes directly from the active portions of the motherboard connector (See e.g., FIG. 3B). The system 600 includes a configuration port 624 to provide bidirectional lanes and a clock (or clocks) to a PCIE connector 630. In this example, the configuration port 624 can provide a ×8 or a ×16 configuration depending on the lane resources to be utilized by the embedded device 614 or routed to other resources via the routing function 620. As noted previously, the configuration port can be a PCIe root port or a processor flex I/O port for example. The pass-through module 610 routes the clock and bidirectional lanes to an unused portion (inactive portion) of the connector 630 as a set of lanes and clocks. In this example, lanes can be routed as ×1's, ×2's, ×4's, ×8's, ×12's, ×16's, or ×32's, for example. Similar to above, the connector 630 can be connected to another connector 640 (e.g., M.2 connector) or an embedded device 650 to receive one set of ×4 lanes and clock.

Figure 7A:
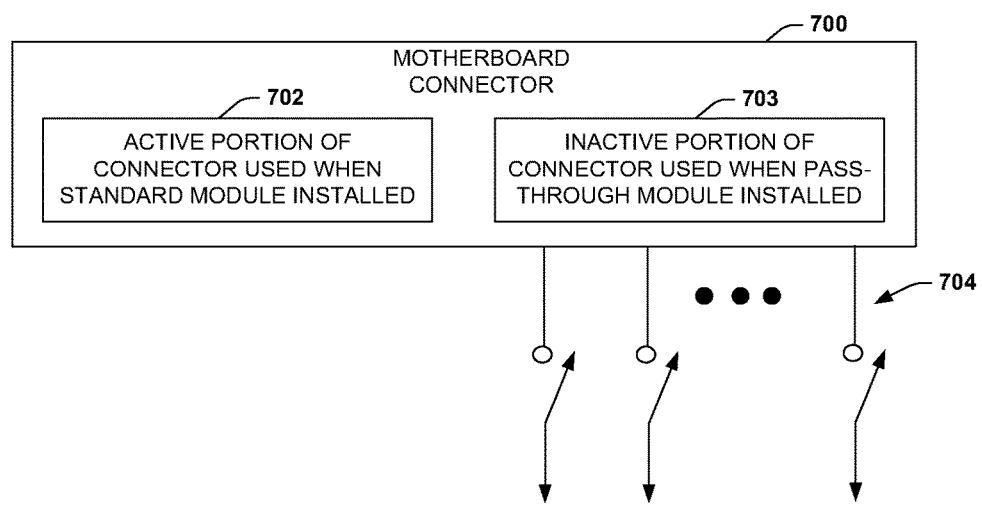
FIG. 7A illustrates a motherboard connector that provides functionality to standard modules when a pass-though module is not installed and utilizes an inactive portion of the connector to provide functionality to other modules or embedded devices when the pass-through module is installed.

FIG. 7A illustrates a motherboard connector 700 that provides functionality to standard modules via an active portion 702 of the connector when a pass-though module is not installed and utilizes an inactive portion 703 of the connector to provide functionality to other modules or embedded devices when the pass-through module is installed. In the examples described herein, the motherboard connector 700 remains fully functional (for its lower lane sets) and remains compatible with standard expansion bus modules such as standard PCIe cards, for example, when the pass-though modules described herein are not installed. An electrical switch 704 having one or more switch contacts can be provided to provide isolation between motherboard connectors when the pass-through module is uninstalled.

Figure 7B:
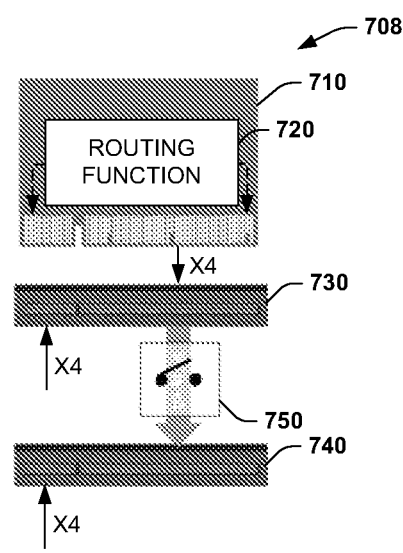
FIG. 7B illustrates an example of a system that includes a pass-through module having a routing function to route bidirectional lanes between active and inactive portions of a connector to provide a connection to a second connector to increase the communications capacity of the second connector.

FIG. 7B illustrates an example of a system 708 that includes a pass-through module 710 having a routing function 720 to route bidirectional lanes between active and inactive portions of a connector to provide a connection to a second connector to increase the communications capacity of the second connector. In this example, a first connector 730 is receives set of ×4 lanes. A second connector 740 receives a second set of ×4 bidirectional lanes. If the connector 740 is unused, the pass-through module 710 can be installed to route the ×4 lanes going to connector 740 to the connector 730 to increase the communications capacity of the connector 730 by increasing the number of lanes from ×4 to ×8. An electrical switch 750 (e.g., contacts closed when pass-through module installed) can be provided to provide isolation between the connector 730 and the connector 740 in the event that both connectors are occupied by modules that utilize the lanes directed to the respective connector. The electrical switch 750 can be active components (e.g., FET switches) or can be mechanical switches to provide isolation between the connectors. Although not shown, the electrical switch 750 can be included with the previous examples described herein with respect to FIGS. 1 through 6.

Figure 8:
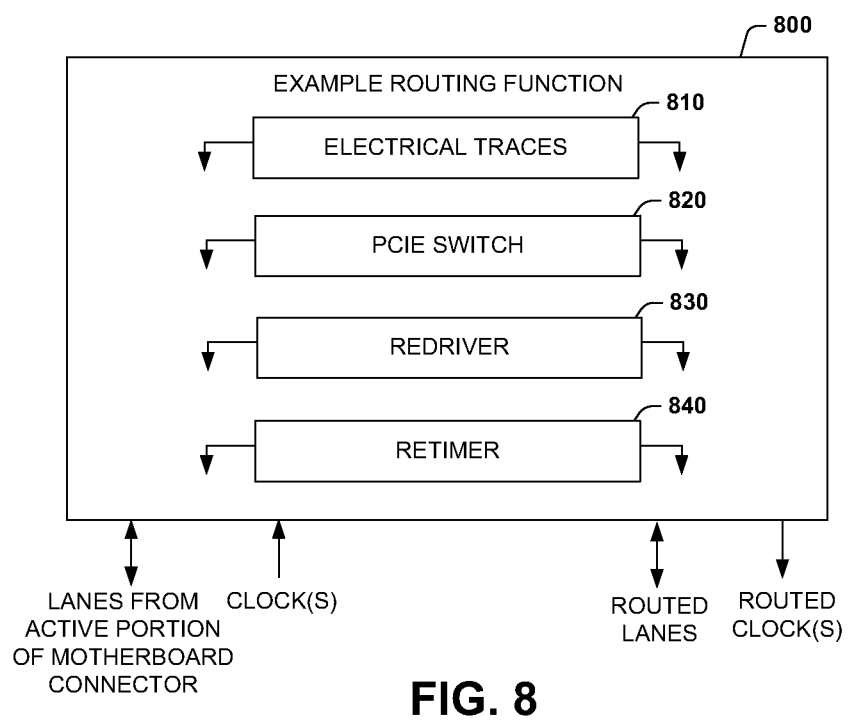
FIG. 8 illustrates an example routing function to facilitate functional reconfiguration of a motherboard.

FIG. 8 illustrates an example routing function 800 to facilitate functional reconfiguration of a motherboard. The routing function 800 can include various components to interface with lanes and/or clock signals from an active portion of a motherboard connector which route lanes and/or clock signals to other motherboard resources as described herein. In one example, the routing function can include electrical traces 810 to provide lane and/or clock routing. The routing function 800 can include a PCIe switch 820 (also referred to as a bridge) to provide routing. In some examples, one routing connection can support one device on each endpoint of each connection. The PCIe switch 820 can create multiple downstream links out of one upstream link, for example. The routing function 800 can also include a redriver 830 (or redrivers). The redriver 830 (also referred to as repeaters) can be employed to provide a signal boosting function to the lanes and/or clock signals described herein. The routing function 800 can also include a retimer 840 (or retimers). Retimers 840 facilitate routing of clock information and can capture training information. This includes automatically configuring each segment of a link.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An apparatus, comprising:
  a pass-through module that includes connector pins to connect with at least one active portion of a motherboard connector and to separately connect with at least one inactive portion of the motherboard connector;
  a routing function on the pass-through module to redirect a set of bidirectional lanes from the connector pins connected to the at least one active portion of the motherboard connector to the connector pins connected to the at least one inactive portion of the motherboard connector to enable a connection of the set of bidirectional lanes to at least one other motherboard resource connected to the at least one inactive portion of the motherboard connector; and
  an embedded device on the pass-through module to communicate directly with bidirectional lanes from the motherboard connector independent of the routing function.

2. The apparatus of claim 1, wherein the bidirectional lanes are serial input and output communications lanes of at least one of a Peripheral Component Interconnect Express (PCIe) bus and a processor flexible I/O bus.

3. The apparatus of claim 1, wherein the routing function includes an electrical trace to redirect the set of bidirectional lanes.

4. The apparatus of claim 1, wherein the routing function includes a PCIe switch, a redriver, a retime, or a clock buffer to redirect the set of bidirectional lanes or a clock signal associated with the set of bidirectional lanes.

5. The apparatus of claim 1, further comprising the embedded device on the pass-through module to communicate with bidirectional lanes routed from the routing function.

6. A system, comprising:
  a pass-through module that includes connector pins;
  a motherboard connector having active connections to connect with a first set of the connector pins and inactive connections to connect with a second set of connector pins of the pass-through module;
  a routing function on the pass-through module to redirect a first subset of bidirectional lanes from the first set of connector pins connected to the active connections of the motherboard connector to the second set of connector pins connected to the inactive connections of the motherboard connector to enable a connection of the first subset of bidirectional lanes to at least one other motherboard resource connected to the inactive connections of the motherboard connector; and
  an embedded device on the pass-through module to communicate directly with a second subset of bidirectional lanes from the motherboard connector independent of the routing function.

7. The system of claim 6, wherein the motherboard connector is a Peripheral Component Interconnect Express (PCIe) connector.

8. The system of claim 7, wherein the at least one other motherboard resource is at least one of a second PCIe connector, an M.2 connector, a serial advanced technology advancement (SATA) connector, a universal serial bus (USB) port, and the embedded device.

9. The system of claim 7, further comprising an electrical switch to support standard expansion board functionality of the PCIe connector and to isolate the PCIe connector from another motherboard resource if the pass-through module is uninstalled.

10. The system of claim 6, wherein the routing function includes at least one of an electrical trace, a PCIe switch, a redriver, and a retimer to route the bidirectional lanes or a clock signal associated with the bidirectional lanes.

11. The system of claim 6, further comprising the embedded device on the pass-through module to communicate with bidirectional lanes routed from the routing function.

12. The system of claim 6, further comprising a configuration port to configure the set of bidirectional lanes.

13. The system of claim 12, wherein the configuration port is at least one of a root port associated with a PCIe bus and a processor port associated with a flexible I/O bus.

14. A system, comprising:
  a pass-through module that includes connector pins;
  a Peripheral Component Interconnect Express (PCIe) motherboard connector having active connections to connect with a first set of the connector pins and inactive connections to connect with a second set of connector pins of the pass-through module;
  a routing function on the pass-through module to redirect a set of bidirectional lanes from the first set of connector pins connected to the active connections of the PCIe motherboard connector to the second set of connector pins connected to the inactive connections of the PCIe motherboard connector to enable a connection of the set of bidirectional lanes to at least one other motherboard resource connected to the inactive connections of the PCIe motherboard connector; and an embedded device on the pass-through module to communicate with bidirectional lanes received from the PCIe motherboard connector and separately received from the routing function.

15. The system of claim 14, further comprising an electrical switch to support standard expansion board functionality of the PCIe motherboard connector and to isolate the PCIe connector from another motherboard resource if the pass-through module is uninstalled.

* * * * *